Patented Aug. 11, 1942

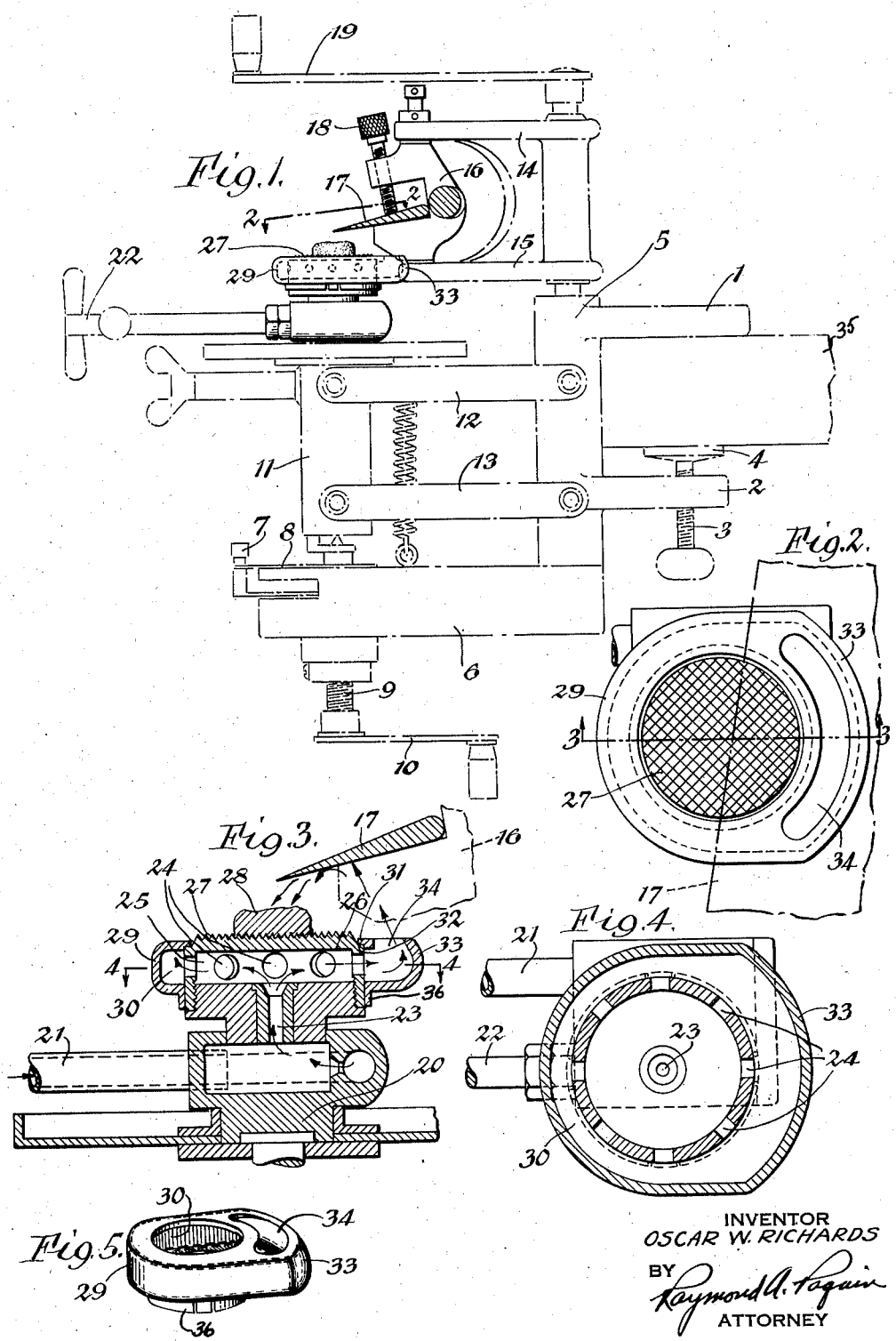

2,292,973

UNITED STATES PATENT OFFICE 2,292,973

MICROTOME

Oscar W. Richards, Snyder, N. Y., assignor to Spencer Lens Company, Buffalo, N. Y., a corporation of New York Application February 6, 1941, Serial No. 377,676

7 Claims. (Cl. 88—40)

This invention relates to microtomes or slicing instruments for cutting very thin sections or slices from an object for microscopic examination and has particular reference to a freezing device for microtomes whereby the object is frozen hard so as to permit the blade to cut thin slices therefrom and to a new and improved method therefor.

A principal object of the invention is to provide a freezing device for microtomes which will cool the knife blade and also freeze the exterior surface of the object.

Another object of the invention is to provide an attachment for microtome freezing devices which will simultaneously cool the microtome knife and freeze the object from below and above and thereby shorten the time required for freezing the object.

Another object of the invention is to provide a freezing device for microtomes with means for cooling the microtome knife and for causing the gas used in cooling the microtome knife to also freeze the upper surface of the object.

Another object of the invention is to provide a detachable member for use with microtome freezing devices now in use which will employ the escaping gas to cool the microtome knife and freeze the exterior of the object.

Another object of the invention is to provide a new and improved method of freezing an object from its lower and upper surfaces and cooling the microtome knife or blade.

Another object of the invention is to provide a new and improved method of cooling microtome knives or blades.

Other objects and advantages of the invention will become apparent from the following description taken in connection with the accompanying drawing. It will be understood that many changes may be made in the details of construction and arrangement of parts and steps of the process shown and described as the preferred form has been shown by way of illustration only.

Referring to the drawing:

Fig. 1 is a side view of a microtome with a freezing device thereon embodying the invention;

Fig. 2 is a sectional view taken on line 2—2 of Fig. 1 and looking in the direction of the arrows;

Fig. 3 is a sectional view taken on line 3—3 of Fig. 2 looking in the direction of the arrows;

Fig. 4 is a sectional view taken on line 4—4 of Fig. 3 looking in the direction of the arrows; and Fig. 5 is a perspective view of one form of device embodying the invention.

Microtome freezing devices are so constructed that carbon dioxide or the like is employed as the freezing medium. This medium is fed through a pipe from a tank supply to a freezing chamber which is below the object support and from which the medium is allowed to escape. The object is frozen from the bottom up, that is, the bottom of the object is frozen first and the object freezes progressively from the bottom upwardly to the top so that by the time the top of the object is frozen the bottom is frozen very hard. As the knife or blade used to cut the thin sections or slices was not cooled, the cut sections would stick to the knife, making the cutting of such sections difficult. It is therefore one of the principal objects of this invention to provide new and improved means for cooling the knife or blade, and for simultaneously freezing the upper surface of the object, and thereby shortening the time required for freezing, and which means will employ the escaping freezing medium.

Referring more particularly to the drawing wherein similar reference characters designate corresponding parts throughout the several views, the microtome shown embodying the invention comprises a clamp member for clamping the microtome to a table or the like 35 comprising an upper jaw 1, a lower jaw 2, and a vertical clamping screw 3 in the lower jaw 2 for engaging the table 35 between the upper jaw 1 and the upper contact portion 4 of said clamp screw 3. These jaws 1 and 2 are supported by an upright or standard 5. At the lower end of the upright 5 is supported a projecting bracket 6 on which is supported the adjusting member 7 and scale member 8 for adjusting the thickness of the slice or section which the knife is to cut from the object. Also supported by the bracket 6 is the vertical screw member 9 with a micrometer thread controlled by the handle 10 whereby the supporting block is raised or lowered to raise or lower the object.

The upright bracket 11 is secured to the forward ends of the vertically swinging rock arms 12 and 13, the pivots of which are so arranged that a parallelogram is formed by the frame, the supporting blocks and the arms connecting the same. By thus supporting the object to be sliced, the same receives a parallelogram movement toward the knife or blade and its top always remains in the same horizontal position so that the slices or sections cut are always uniformly thick. At the upper end of said member 11 is the object support or table adapted to support the object from which sections are to be cut.

On the upright 5 are pivotally connected the pair of horizontally swinging arms 14 and 15. At the forward end of the said arms is positioned the knife support 16 supporting the knife or blade which is clamped thereon by the set screw 18.

The relative arrangement of the pivots connecting the arms with the frame and the knife supporting bar is such that a parallelogram is formed by these parts. By moving the handle 19 back and forth, the knife is caused to move likewise.

It will be seen that by supporting the object to be sectioned or sliced as stated above, that when the knife is moved back the object is automatically raised so that its top always remains in the same horizontal position and the slices or sections cut therefrom are always uniformly thick as the set screw is automatically turned for raising the supporting block after each cut of the knife by means of a ratchet wheel and pawl arm on the support 6.

The arrangement for supporting the object to be cut comprises the head portion 20 to which is secured the pipe line 21 adapted to lead from a cylinder of carbon dioxide or other freezing medium to provide means for freezing the object. There is also provided a valve member controlled by the handle 22 for turning on or off and regulating the supply of the freezing medium. The member 20 also is provided with the opening 23 communicating from the connection with the pipe line supply to the freezing medium with the upper portion of the head to direct the freezing medium therein and said upper portion is provided with the openings 24 leading from the chamber 25 to allow said freezing medium to escape. Over the chamber 25 is placed the cap 26 having a roughened or serrated surface 27 on which the object or specimen to be cut is positioned. On said head is supported the attachment 29. This attachment 29 has a circumferential channel 30 adapted to be in alignment with said openings 24 and has the circumferential lip or flange 31 adapted to seat on the upper edge of the circumferential flange 32 in the head to hold the member 29 in operative position and has a lower flange 36 to provide a tight connection and frictionally hold the device in place. The member 29 may be pivoted to desired position as hereinafter described.

The member 29 also has thereon at one side an extended portion 33 with an upper slot or opening 34 as shown particularly in Figs. 2 and 3.

When the member 29 is placed on the head of the freezing attachment it is turned so that the slotted portion is placed toward the side of the device on which the knife is normally placed.

When using the device, the specimen 28 is placed on the serrated portion 27 of the blade 26 together with a little water or gum material. The handle 10 is then turned to lower the object and the knife is then placed partially over the object as shown in Fig. 3, and the handle 22 turned to open the valve and allow the freezing medium to enter the head 20. This freezing medium enters the head through the openings 23 into the chamber 25 and causes the water or gum material to freeze to hold the specimen 28 securely in position on said serrated face 27 and then the said freezing material causes the object or specimen 28 itself to become frozen.

The freezing medium escapes from said chamber 25 through the openings 24 into the channel 30, which channel directs the same outwardly from the member 29 through the slot therein 34 which is beneath the knife or blade 17 as shown in detail in Fig. 3. This freezing medium then rises and hits the blade as shown by the arrows in Fig. 3 cooling said knife or blade and is then deflected back by the blade to the upper surface of the specimen 28, as is also shown by the arrows in Fig. 3, and causes the outer surface of the object 28 to freeze also. It will be seen that by employing the arrangement described above the knife or blade is cooled and the outer surface of the specimen 28 is also frozen so that the object is frozen and ready for cutting in considerably less time than has been necessary in the prior art and also as the knife or blade itself is cooled the sections or slices do not stick to it or become broken thereby.

When the object or specimen has become sufficiently frozen it is raised to the proper height by means of the handle 10 and the knife is then pulled first back and then forward to cut the desired sections or slices. The knife or specimen or both may be cooled at any time by repeating the procedure set forth above.

It will be noted that the member 29 may be made integral with the other parts of the instrument if desired, or it may be made a separate attachment as shown in Fig. 5, which will allow its being employed with microtomes already in use.

From the foregoing it will be seen that I have provided simple, efficient and economical means for obtaining all of the objects and advantages of the invention and particularly in providing means and process for employing the freezing medium which has previously been wasted, for cooling the knife or blade and freezing the outer surface of the specimen and for directing the escaping freezing medium away from the operator.

Having described my invention, I claim:

1. In a device of the character described, means for supporting an object, a blade, means for supporting said blade relative to said object support and movable relative to said object support to cut sections from an object on said support, a freezing chamber adjacent said object support whereby objects on said support may be frozen, means connecting said freezing chamber with a supply of a freezing medium for use in freezing said object, exhaust means in said freezing chamber to allow the released freezing medium to escape therefrom and means adjacent said freezing chamber adapted to collect said freezing medium escaping therefrom and direct said escaping freezing medium towards said blade to cool the same.

2. In a device of the character described, means for supporting an object, a blade, means for supporting said blade relative to said object support, and movable relative to said object support to cut sections from an object on said support, a freezing chamber adjacent said object support whereby objects on said support may be frozen, means connecting said freezing chamber with a supply of a freezing medium for use in freezing said object, openings in said freezing chamber to allow the released freezing medium to escape therefrom and means adjacent said freezing chamber for collecting said freezing medium escaping through said openings and direct said escaping freezing medium towards said blade to cool the same.

3. In a device of the character described, an object support, a blade, means for supporting said blade relative to said object, and movable relative to said object support to cut sections from an object on said support, a freezing chamber adjacent said object support whereby objects on said support may be frozen, means connecting said freezing chamber with a supply of a freezing medium for use in freezing said object, circumferential openings in said freezing chamber to allow the released freezing medium to escape therefrom and means adjacent said freezing chamber for collecting said freezing medium escaping through said circumferential openings and direct said escaping freezing medium towards said blade to cool the same.

4. In a device of the character described, means for supporting an object, a blade, means for supporting said blade relative to said object support and movable relative to said object support to cut sections from an object on said support, a freezing chamber adjacent said object support whereby objects on said support may be frozen, means connecting said freezing chamber with a supply of a freezing medium to supply said medium for use in freezing said object, openings in said freezing chamber to allow the released freezing medium to escape therefrom and a member having a channel portion adjacent said openings for collecting said freezing medium escaping through said openings and directing said escaping freezing medium towards said blade to cool the same.

5. A knife cooling member for use with a device having means for supporting an object, a blade, means for supporting said blade relative to said object support and movable relative to said object support to cut sections from an object on said support, a freezing chamber adjacent said object support whereby objects on said support may be frozen, means connecting said freezing chamber with a supply of a freezing medium to supply said freezing medium to said freezing chamber for use in freezing an object, exhaust means in said freezing chamber to allow the released freezing medium to escape therefrom, said knife cooling member having a portion adjacent said freezing chamber communicating with said exhaust means for collecting said escaping freezing medium and directing said escaping freezing medium towards said blade to cool the same.

6. A knife cooling member for use with a device having means for supporting an object, a blade, means for supporting said blade relative to said object support and movable relative to said object support to cut sections from an object on said support, a freezing chamber adjacent said object support whereby objects on said support may be frozen, means connecting said freezing chamber with a supply of a freezing medium to supply said freezing medium to said freezing chamber for use in freezing an object, exhaust means in said freezing chamber to allow the released freezing medium to escape therefrom, said knife cooling member having a portion surrounding said freezing chamber and communicating with said exhaust means for collecting said escaping freezing medium and directing said escaping freezing medium towards said blade to cool the same.

7. A knife cooling member for use with a device having means for supporting an object, a blade, means for supporting said blade relative to said object support and movable relative to said object support to cut sections from an object on said support, a freezing chamber adjacent said object support whereby objects on said support may be frozen, means connecting said freezing chamber with a supply of a freezing medium to supply said freezing medium to said freezing chamber for use in freezing an object, exhaust means in said freezing chamber to allow the released freezing medium to escape therefrom, said knife cooling member having a channel portion surrounding said freezing chamber and communicating with said exhaust means for collecting said escaping freezing medium and directing said escaping freezing medium towards said blade to cool the same.

OSCAR W. RICHARDS.